United States Patent [19]

Smith

[11] Patent Number: 5,677,977

[45] Date of Patent: Oct. 14, 1997

[54] OPTICAL ATTENUATOR

[75] Inventor: Terry J. Smith, Elizabethtown, Pa.

[73] Assignee: Sentech Systems, Inc., Mount Joy, Pa.

[21] Appl. No.: 649,010

[22] Filed: May 16, 1996

[51] Int. Cl.$^6$ .................................................. G02B 6/36
[52] U.S. Cl. ............................................................ 385/140
[58] Field of Search .................................. 385/134, 140, 385/147, 32; 250/227.16

[56] References Cited

U.S. PATENT DOCUMENTS

| | | | |
|---|---|---|---|
| 4,697,869 | 10/1987 | So et al. | 385/140 |
| 4,721,351 | 1/1988 | Goepfert et al. | 385/140 |
| 4,881,793 | 11/1989 | Tarbox | 385/140 |
| 4,952,798 | 8/1990 | Graham et al. | 385/140 |
| 4,979,793 | 12/1990 | Bowen et al. | 385/140 |
| 5,311,614 | 5/1994 | Caron et al. | 385/140 |
| 5,319,734 | 6/1994 | Buzzetti | 385/140 |

*Primary Examiner*—Akm E. Ullah
*Assistant Examiner*—Hemang Sanghavi
*Attorney, Agent, or Firm*—Martin Fruitman

[57] ABSTRACT

The apparatus is an attenuator for use in an optical fiber link. The attenuator is a full circular loop of continuous optical fiber with connection means at the ends of the loop to interconnect with the other optical fiber components in the system. The attenuation of optical transmission through the loop is continuously variable by twisting the loop out of its original planar configuration. A lockable rotating shaft clamped to the side of the loop remote from the connection means is turned to rotate the loop.

7 Claims, 1 Drawing Sheet

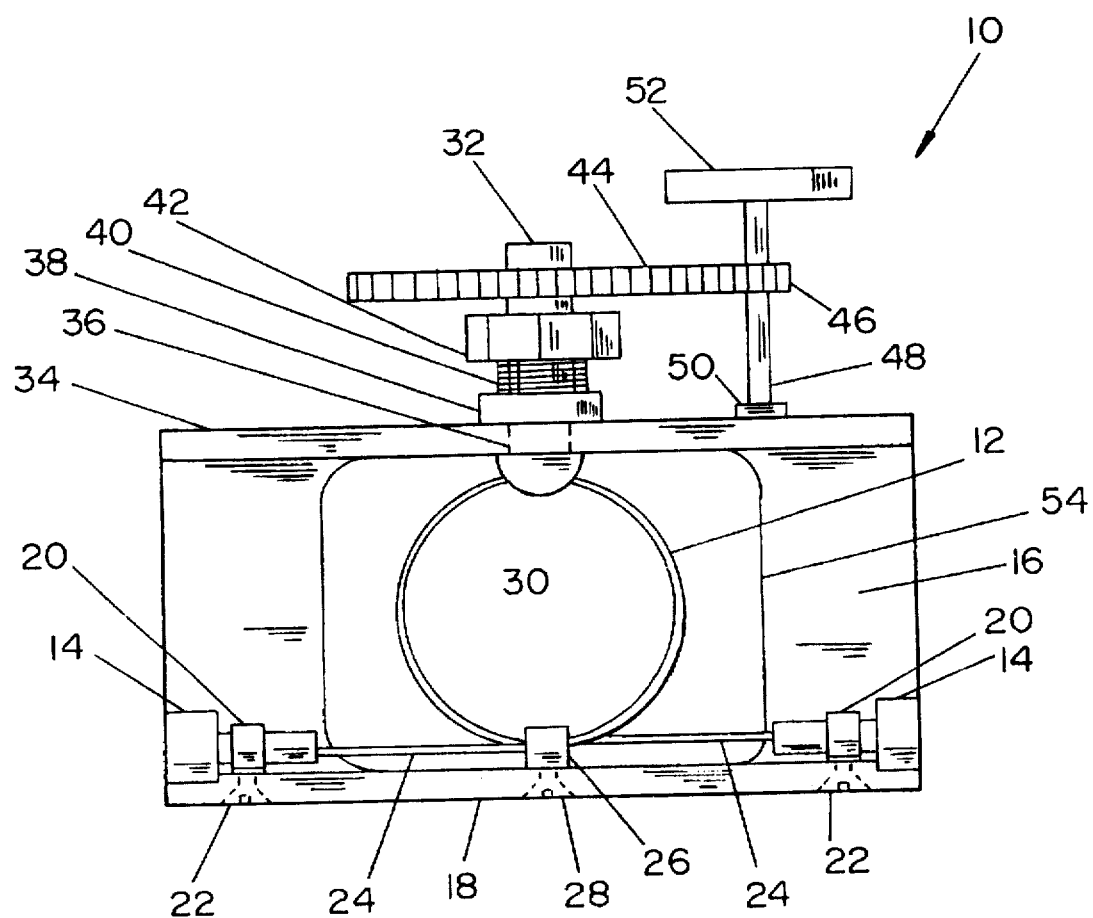

OPTICAL ATTENUATOR

BACKGROUND OF THE INVENTION

This invention deals generally with optical waveguides and more specifically with attenuators within optical waveguides.

Optical attenuators are a necessity within operating systems of optical waveguides, commonly referred to as optical fibers. Optical attenuators permit matching the optical signal within an optical fiber system to individual components, such as optical receivers, without saturating the components and making them insensitive to small changes in the signal. However, the large variety of optical components available, all with different sensitivities and saturation points, makes devices with fixed attenuations impractical to use. Therefore adjustable attenuators, which can be used in numerous different applications, are becoming common.

One method of attaining variable attenuation is by bending an optical fiber, or a bundle of such fibers, through which signal is carried. U.S. Pat. Nos. 4,979,793 to Bowen et al, 5,311,614 to Caron et al, and 5,319,734 to Buzzetti all disclose such an optical fiber attenuator. They all use a plunger type of arrangement to form a "U" shaped bend within a section of a bundle of optical fibers. The variability is accomplished by increasing or decreasing the depth of the "U" shaped distortion with a plunger, which varies the radius of curvature of the distorted optical fibers, and thus causes more or less optical loss in the optical fibers.

Although such optical attenuators do work, unfortunately there is a significant problem with such plunger type optical attenuators. It is the lack of long term stability of the attenuation effect. What appears to have been overlooked is the severe localized mechanical stress which the plunger type of distortion places upon the optical fibers. Any such severe mechanical stress is inherently unstable. As the temperature of a stressed assembly changes, its dimensions also change, thus changing its optical properties. This effect is exaggerated even more if different portions of the assembly are subjected to different temperature gradients. Furthermore, even without temperature changes, mechanical devices, and particularly the optical fibers themselves, will change their characteristics when subjected to severe continuous stress over a long period of time.

Clearly, an optical attenuator which is simple to operate and construct, but which maintains long term stability because it does not subject the optical fibers to severe localized stress, would be a valuable addition to optical fiber systems.

SUMMARY OF THE INVENTION

The present invention furnishes a continuously adjustable optical fiber attenuator with long term stability because the attenuator does not subject any part of the optical fiber within the attenuator to undue mechanical stress.

The attenuator of the preferred embodiment contains a full circular loop of a single continuous optical fiber with end couplers at the ends of the loop to interconnect with the other optical fiber components in the system. The optical fiber loop is located within a frame with the end couplers anchored to the frame, and the side of the loop most remote from the end couplers is held within a slot in a fixture attached to a rotatable shaft. The shaft penetrates a hole within one side of the frame, and is lockable with a nut clamping a conventional slotted sleeve. A gear reduction drive can be added to provide the shaft with a very accurate fine adjustment.

Thus, as the shaft is rotated, the optical fiber loop is twisted and varied between an orientation in which it is in the same plane as the end couplers and an orientation in which it is in a plane perpendicular to the plane in which the end couplers are located. In the preferred embodiment of the invention, the optical fiber loop can be rotated as much as several turns from its original position in the plane of the couplers. As the planar orientation of the optical fiber loop is continuously varied, the attenuation of optical transmission through the loop is also continuously varied by the resultant twisting of the optical fiber loop.

Although the twisting action of the invention upon the optical fiber causes attenuation of the optical signal transmitted through the optical fiber, it does not subject the optical fiber to the severe stress of the plunger type distortion of the prior art devices. This is because in the present invention both the attenuation effect and the applied mechanical stress are distributed over the entire length of the optical fiber loop, while in the prior art attenuators the stress is concentrated within a very short length of the optical fiber. In a typical plunger type optical attenuator all the bending of the fiber, and therefore all the mechanical stress is applied to a length of optical fiber which measures only about one-half inch, while in the present invention the mechanical stress is distributed over the entire loop, which in the case of the preferred embodiment is about two and one-half inches of optical fiber. The stress in the loop is symmetrical, and the resulting equal and opposite loading over the halves of the loop has a tendency to cancel the mechanical creep, thereby stabilizing the attenuation. This results in an applied stress in the present invention which is well within the acceptable limits for the optical fiber, and a stress which does not cause any long term instability in the characteristics of the optical attenuator.

The present invention thereby furnishes a continuously variable optical attenuator which is simple to construct and operate, and one which affords long term stability which far surpasses that of any such attenuators previously available.

BRIEF DESCRIPTION OF THE DRAWING

The FIGURE is a side view of the preferred embodiment of the invention.

DETAILED DESCRIPTION OF INVENTION

The FIGURE is a side view of the preferred embodiment of the invention in which continuously adjustable optical attenuator 10 is constructed with optical fiber loop 12 which has end couplers 14 attached so that optical attenuator 10 can be inserted into an optical fiber system in series with an optical fiber transmission line (not shown). Optical fiber loop 12 is installed within frame 16 by anchoring end couplers 14 to frame bottom 18 with clamps 20 held by screws 22. In a similar manner, the part of optical fiber loop 12 at which the opposite end segments 24 of optical fiber loop 12 cross each other, that is, where loop 12 crosses itself, is anchored to frame bottom 18 by clamp 26 which is attached by screw 28.

The part of optical fiber loop 12 which is diametrically opposite from clamp 26 is attached to rotating head 30 which is connected to rotating shaft 32, so that part of loop 12 which is attached to rotating head 30 rotates in a plane remote from clamp 26. Shaft 32 penetrates frame top 34 through hole 36 and is held in its axial position by conventional bushing 38. Shaft 32 passes through conventional split collar 40 which has outside threads and can be locked tightly around shaft 32 by tapered nut 42 in any position of rotation of shaft 32. Thus, as tapered nut 42 is tightened down, split collar 40 is clamped around shaft 32 and prevents shaft 32 from rotating.

When fine control of the rotation of shaft 32 is desired, gear 44 is attached to shaft 32. Gear 46 which is mounted on shaft 48 is then located to engage gear 44. Shaft 48 is installed in conventional bearing 50 in frame top 34, and knob 52 is attached to an accessible location on shaft 48. Thus, turning knob 52 rotates shaft 32 at a greatly reduced speed, and very fine adjustment of the rotation of optical fiber loop 12 is possible. It should be noted that frame 16 includes cutout 54 which prevents frame 16 from interfering with the rotation of optical fiber loop 12.

The operation of optical attenuator 10 is very simple. The attenuation characteristics of optical fiber loop 12 vary as optical fiber loop 12 is twisted by rotation of shaft 32 and rotating head 30. When optical fiber loop 12 is oriented in the position shown in the FIGURE, there is less that 0.1 db loss in the optical signal passing through optical attenuator 10. However, when rotating head 30 is rotated to a rotation of 270 degrees in either direction from the position shown, optical attenuator 10 provides a loss of approximately 60 db. Intermediate rotational positions are available between those points with a smooth, continuously varying, logarithmic relationship to the rotation angle of the loop.

As stated above, the rotation and loss characteristics are not linearly related, but calibration is a simple matter in such devices. The more important benefit of the present invention is that its attenuation characteristics are exceptionally stable because of the uniform stress distribution. Once a particular attenuation is set and shaft 32 is locked in place, that value of attenuation will remain stable despite temperature changes, mechanical shock, and the passage of time. The low stress which the present invention applies to the optical fiber affords users the ultimate luxury of "set it and forget it".

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, different anchoring means, anchoring locations, and end connection means may be used for the optical fiber loop, and different rotating and locking arrangements may also be used. Furthermore, the optical fiber loop can be formed of more than a single fiber, as when it is formed of a bundle of fibers.

What is claimed as new and for which Letters patent of the United States are desired to be secured is:

1. An optical attenuator for use in optical fiber transmission paths comprising:

a frame;

a bundle of at least one optical fiber, with the bundle having two ends:

connection means attached at the two ends of the optical fiber bundle;

a loop formed of the optical fiber bundle, with a first location on the loop anchored to the frame; and a rotating means attached to the frame so that the rotating means rotates in a plane remote from the first location on the loop, with the rotating means also attached to a second location on the loop for twisting the optical fiber loop such that the mechanical stress due to the twisting is distributed over the entire length of the loop.

2. The optical attenuator of claim 1 wherein the first location on the loop is at a location where the loop crosses itself.

3. The optical attenuator of claim 1 wherein the connection means are also anchored to the frame.

4. The optical attenuator of claim 1 wherein the rotating means is lockable in any position of rotation.

5. The optical attenuator of claim 1 wherein the rotating means is driven by a speed reduction means to provide fine adjustment.

6. The optical attenuator of claim 1 wherein the loop is rotatable into a position such that the loop and the connection means are in a single plane.

7. The optical attenuator of claim 1 wherein the second location on the loop to which the rotating means is attached is located opposite from the first location on the loop.

\* \* \* \* \*